United States Patent Office 3,334,137
Patented Aug. 1, 1967

3,334,137
THIOACETAMIDOXIMES
François T. Bruderlein, Montreal, Quebec, Canada, assignor to American Home Products Corporation, New York, N.Y., a corporation of Delaware
No Drawing. Filed Dec. 29, 1965, Ser. No. 517,445
5 Claims. (Cl. 260—564)

The present invention relates to thioacetamidoximes of the following general Formula I

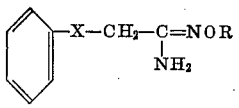

in which X represents S, SO, or $SO_2$ and R represents hydrogen or a lower alkynyl group containing from one to three carbon atoms.

The compounds of this invention have antibacterial, antifungal, and trichomonicidal activities. As antibacterial agents, they are particularly effective against *Staphylococcus pyogenes*; as antifungal agents they are active against fungi such as *Candida albicans, Microsporum gypeseum,* and *Trichophyton granulosum*; they are also particularly effective against *Trichomonas vaginalis*.

As antibacterial and antifungal agents, the compounds of this invention may be used for topical application in the forms of solutions, creams, or lotions, containing from 0.1 to 1.0 percent of the active ingredient, to be applied from one to three times a day. As trichomonicidal agents, they are most advantageously used in the forms of creams or vaginal suppositories or inserts, containing from 0.1 to 1.0 percent of the active ingredient, to be applied once or twice a day.

The compounds of this invention are prepared by reacting a suitable nitrile with hydroxylamine hydrochloride in a solvent such as a lower alkanol in the presence of a baste such as alkali metal lower alkoxide. The resulting amidoxime may then be alkylated with an alkynyl halide containing from one to three carbon atoms in the presence of a suitable base such as alkali metal lower alkoxide.

More specifically, phenylthioacetonitrile prepared as described by Dijkstra and Backer in Rec. Trav. Chim. Pays-Bas, vol. 73, p. 569 (1954) is reacted with hydroxylamine hydrochloride in the presence of a substantially equimolar amount of an alkali metal lower alkoxide, preferably sodium metoxide. The resulting thiophenoxy-acetamidoxime is obtained by extraction with a water immiscible solvent and isolated directly by crystallization or by addition of hydrogen chloride as the hydrochloride salt.

The corresponding sulfinyl and sulfonyl derivatives are obtained by oxidizing the starting material, phenylthio-acetonitrile, to the corresponding phenylsulfinyl or phenylsulfonyl acetonitrile, and reacting the latter compounds with hydroxylamine as described above.

The amidoximes obtained as above may then be alkylated in the conventional manner with an alkynyl halide such as, for example, propargyl bromide, in the presence of an alkali metal lower alkoxide, preferably sodium ethoxide, to obtain the corresponding compounds of Formula I in which R represents a lower alkynyl radical.

The following examples and formulae, in which X and R have the significance defined above, will illustrate my invention.

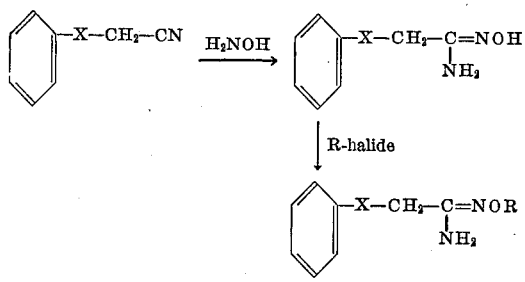

Example 1

Hydroxylamine hydrochloride (13.9 g., 0.202 M) in 100 ml. of methanol are added to 10.9 g. of sodium methoxide (0.202 M) in 50 ml. of methanol. To this suspension 25 g. of phenylthioacetonitrile (0.168 M, prepared as described by R. Dijkstra and H. J. Backer, Rec. Trav. Chim. Pays-Bas, 73, 569, 1954) are added dropwise, then refluxed for 3 hours. The solvent is removed to yield thiophenoxyacetamidoxime, an oil with I.R. absorption peaks at 2.9, 3.0 and 6.07μ, which is triturated with hot isopropyl alcohol. The solution is concentrated and treated with an ethereal solution of hydrogen chloride. The hydrochloride salt of thiophenoxyacet-amidoxime is recrystallized from isopropyl alcohol to M.P. 140–143° C.

Example 2

Phenylthioacetonitrile (10 g.) is dissolved in 50 ml. of acetic acid and 1.3 ml. of sulfuric acid. To this solution, cooled to 0° C., 13.1 g. of 30% solution of hydrogen peroxide is added dropwise at such a rate that the temperature is kept around 10–12° C. The reaction mixture is kept for 15 minutes at room temperature, then poured on 200 ml. of water, extracted with ethyl acetate, concentrated under reduced pressure and chromatographed on silica gel in 10% ethyl acetate-benzene. The desired phenyluslfinylacetonitrile is eluted with 30% ethyl acetate-benzene and recrystallized to a M.P. 66–67° C.

Example 3

In the same manner as described in Example 1, but starting with phenylsulfinylacetonitrile obtained as in Example 2, phenylsulfinylacetamidoxime is directly obtained by concentrating the isopropyl alcohol solution to dryness and recrystallizing the crude precipitate from benzene-absolute ethanol to M.P. 102–104° C.

Example 4

Phenylsulfonylacetonitrile (28.4 g., 0.157 M), prepared according to the method of R. Dijkstra and H. J. Backer cited above is treated with 13 g. of hydroxylamine hydrochloride and 10.5 g. of sodium methoxide exactly as described in Example 1. The resulting phenylsulfonyl-acetamidoxime is recrystallized from isopropanol to M.P. 165–168° C.

Example 5

Phenylsulfonylacetamidoxime (8.5 g., prepared as described in Example 4) is reacted with sodium ethoxide prepared from 0.9 g. sodium metal and 70 ml. absolute ethanol and 5.2 g. propargyl bromide in 20 ml. absolute ethanol. After cooling, the alcohol is removed under reduced pressure, the residue taken up in water, extracted with ethyl acetate, dried concentrated to dryness and recrystallized from benzene-hexane to yield O-propargyl-phenylsulfonylacetamidoxime, M.P. 100–102° C.

I claim:
1. A compound of the formula

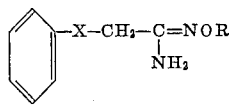

wherein X is selected from the group consisting of S, SO and $SO_2$ and R is selected from the group consisting of hydrogen and lower alkynyl containing from one to three carbon atoms.

2. Thiophenoxyacetamidoxime as claimed in claim 1.
3. Phenylsulfinylacetamidoxime as claimed in claim 1.
4. Phenylsulfonylacetamidoxime as claimed in claim 1.
5. O - propargyl - phenylsulfonylacetamidoxime as claimed in claim 1.

No references cited.

CHARLES B. PARKER, *Primary Examiner.*
ROBERT V. HINES, *Assistant Examiner.*